United States Patent
Xu et al.

(10) Patent No.: US 12,366,453 B2
(45) Date of Patent: Jul. 22, 2025

(54) SYSTEMS AND METHODS FOR DETERMINING MAP MATCHED LOCATIONS ON A CLIENT DEVICE

(71) Applicant: Lyft, Inc., San Francisco, CA (US)

(72) Inventors: Raymond Xu, San Francisco, CA (US); Tony Zhang, San Francisco, CA (US); Karina Goot, San Francisco, CA (US); Burak Bostancioglu, Alameda, CA (US); Jun Wu, Oakland, CA (US); Garrett Deland Wells, San Francisco, CA (US); Yanrong Li, Mountain View, CA (US); Benjamin Kin Hoong Low, New York, NY (US); Kerrick Alexander Staley, Jersey City, NJ (US); James Kevin Murphy, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 282 days.

(21) Appl. No.: 17/869,561

(22) Filed: Jul. 20, 2022

(65) Prior Publication Data

US 2024/0027198 A1 Jan. 25, 2024

(51) Int. Cl.
*G01C 21/34* (2006.01)
*G06V 20/10* (2022.01)

(52) U.S. Cl.
CPC ....... *G01C 21/3407* (2013.01); *G06V 20/182* (2022.01)

(58) Field of Classification Search
CPC .......................... G01C 21/3407; G06V 20/182
See application file for complete search history.

(56) References Cited

U.S. PATENT DOCUMENTS

| | | | |
|---|---|---|---|
| 2016/0334226 A1* | 11/2016 | Duan | G01C 21/3667 |
| 2019/0316925 A1* | 10/2019 | Jang | G01C 21/3461 |
| 2020/0201344 A1* | 6/2020 | Viswanathan | G05D 1/0088 |
| 2020/0240791 A1* | 7/2020 | Patault | G01C 21/3453 |
| 2023/0258457 A1* | 8/2023 | Jiang | G08G 1/0141 |
| | | | 701/446 |
| 2023/0288210 A1* | 9/2023 | Holicki | G01C 21/3602 |

* cited by examiner

*Primary Examiner* — Anil K Bhargava
(74) *Attorney, Agent, or Firm* — Lee Sullivan Shea & Smith LLP

(57) ABSTRACT

A client device is configured to (i) based on initial sensor data and a road network graph maintained on the client device, determine a set of particles corresponding to the road network graph, each particle including a (a) trajectory along the road network graph, (b) position and velocity, and (c) probability, (ii) identify a particle with a highest probability, (iii) based on the identified particle, determine the location of the client device in the road network graph, (iv) after receiving new sensor data, extend the trajectory of each particle, (v) based on the new sensor data, update, for each particle (a) the position and velocity and (b) the probability, (vi) identify a particle from the second updated set of particles with a highest probability, and (vii) based on the identified particle, determine the updated location of the client device in the road network graph.

20 Claims, 12 Drawing Sheets

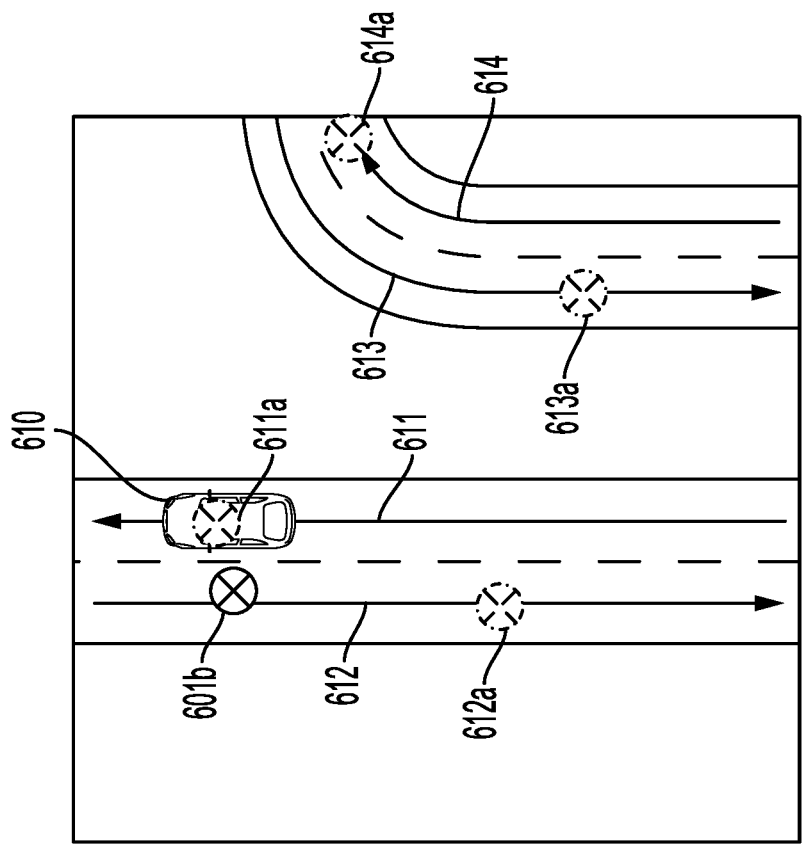
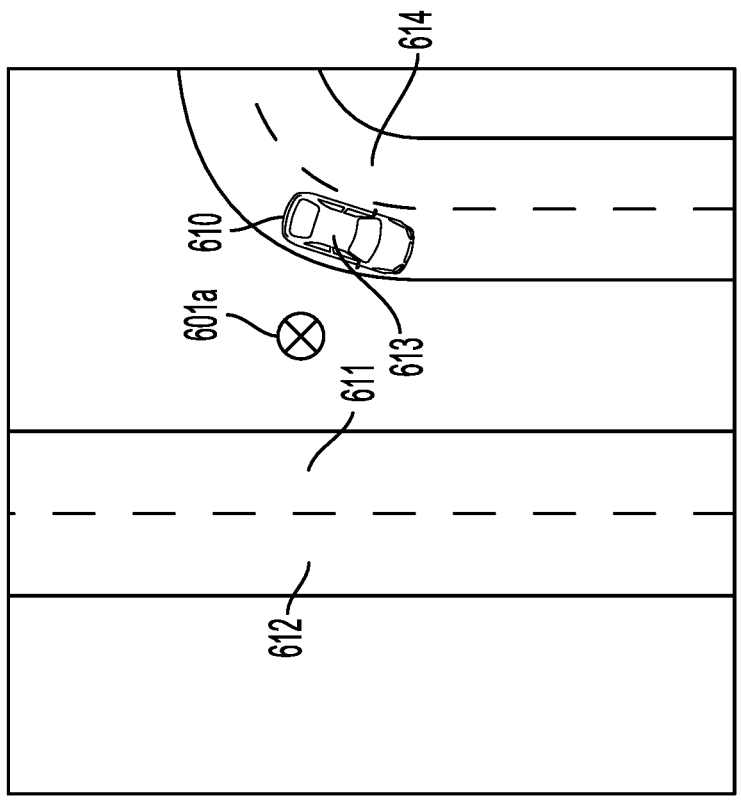
FIG. 6B
FIG. 6A

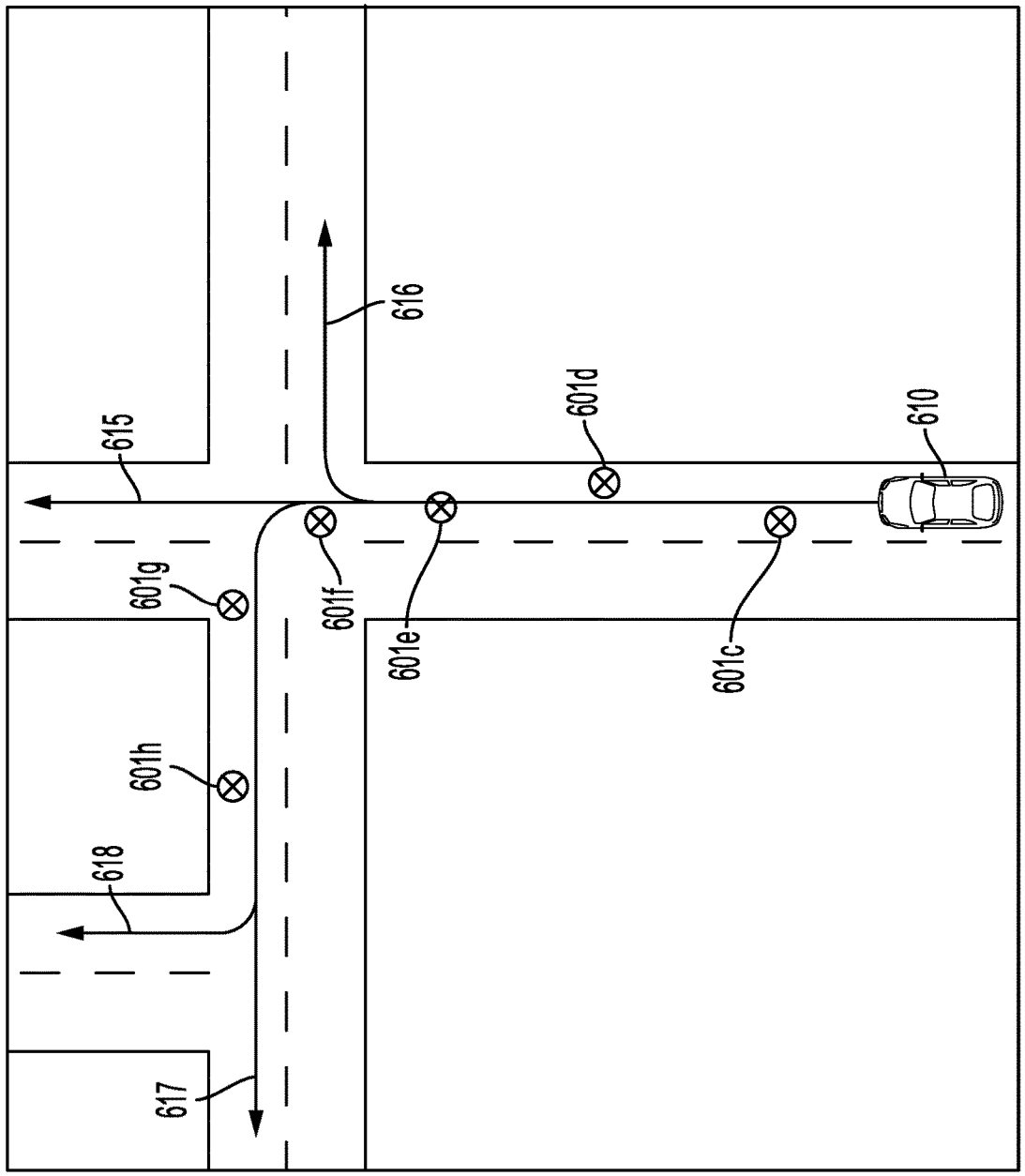

SYSTEMS AND METHODS FOR DETERMINING MAP MATCHED LOCATIONS ON A CLIENT DEVICE

BACKGROUND

In various areas of technology, pre-encoded information about the world (which may sometimes be referred to as a map or map data) may be utilized to perform various operations. As one possible example, navigation applications running on client devices may use maps to perform operations such as determining possible routes from a source location to a destination location, providing estimates of the time it will take to travel from the source location to the destination location along a possible route, and/or providing visualizations of a mapped area to users of the client devices. As another example, transportation-matching platforms such as rideshare platforms may use pre-encoded information about the world to perform operations such as matching individuals with available vehicles, generating routes for vehicles to follow when picking up and/or transporting individuals, providing estimates of pickup and drop-off times, choosing locations for performing pickups and/or drop-offs, pre-positioning vehicles within the given area in anticipation of responding to transportation requests, and/or providing visualizations to end users such as riders or drivers, among other possibilities. It should be understood that pre-encoded information about the world (or perhaps other geographically-associated information) may be used in various other areas of technology as well.

SUMMARY

In one aspect, the disclosed technology may take the form of a method that involves: (i) obtaining initial sensor data, (ii) based on the initial sensor data and a road network graph maintained on the client device, determining a set of particles corresponding to the road network graph, wherein each particle comprises a respective (a) trajectory of the client device along the road network graph, (b) position and velocity for the client device along the trajectory, and (c) probability that the particle reflects a location of the client device, (iii) identifying a particle from the set of particles with a highest probability, (iv) based on the identified particle from the set of particles with the highest probability, determining the location of the client device in the road network graph, (v) obtaining new sensor data, (vi) after obtaining the new sensor data, extending the respective trajectory of each particle in the set of particles, thereby creating first updated set of particles, (vii) based on the new sensor data, updating, for each particle in the first updated set of particles (a) the position and velocity of the client device and (b) the probability that the particle reflects an updated location of client device, thereby creating a second updated set of particles, (viii) identifying a particle from the second updated set of particles with a highest probability, and (ix) based on the identified particle from the second set of updated particles with highest probability, determining the updated location of the client device in the road network graph.

In some example embodiments, the method may also involve determining that one or more particles in the second updated set of particles has a probability that is below a minimum threshold and, based on determining that the one or more particles in the second updated set of particles has a probability that is below a minimum threshold, removing the one or more particles from the second updated set of particles.

Further, in example embodiments, extending the respective trajectory of each particle in the set of particles, thereby creating first updated set of particles may involve (i) for at least one trajectory, determining that the trajectory meets an intersection of road segments in the road network graph, wherein each road segment corresponds to a possible trajectory through the intersection, (ii) based on determining that the at least one trajectory meets the intersection of road segments in the road network graph, determining at least one new particle for each possible trajectory through the intersection, and (iii) adding the new particles to the first updated set of particles.

Further yet, in example embodiments, the method may also involve (i) receiving, via a user interface of the client device, a routing request, (ii) based on the determined location of the client device in the road network graph, determining a route line indicating a sequence of road segments to be followed in response to the routing request, wherein updating the probability of a given particle in the first updated set of particles comprises increasing the probability of the given particle based on the particle corresponding to the route line.

Still further, in some example embodiments, the method may also involve (i) based on the initial sensor data, determining a rough location for the client device, (ii) determining a set of map cells centered on the rough location, (iii) determining that at least one map cell in the set of map cells is not stored in memory of the client device, (vi) receiving the at least one map cell from a back-end platform, and (v) assembling the road network graph using the set of map cells, wherein the set of map cells includes the at least one map cell received from the back-end platform.

Still further, in some example embodiments, determining the set of map cells centered on the rough location may involve determining the set of map cells within a predetermined distance of the rough location Still further, in some example embodiments, the new sensor data is first new sensor data, and set of map cells is a first set of map cells, and the method may also involve (i) obtaining second new sensor data, (ii) based on the second new sensor data, determining a new rough location for the client device, (iii) determining a second set of map cells centered on the new rough location, (iv) determining that at least one map cell in the second set of map cells is unavailable, and (v) based on determining that at least one map cell in the second set of map cells is unavailable, discontinuing using the road network graph to determine locations of the client device.

Still further, in some example embodiments, the method may also involve, based on determining that at least one map cell in the second set of map cells is unavailable, transmitting third new sensor data to the back-end platform to determine a second updated location of the client device.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 6A is a diagram that illustrates one example of a set of particles determined by a client device.

FIG. 6B is a diagram that illustrates one example of an updated set of particles determined by a client device.

FIG. 6C is a diagram that illustrates another example of an updated set of particles determined by a client device.

DETAILED DESCRIPTION

Figure 1:
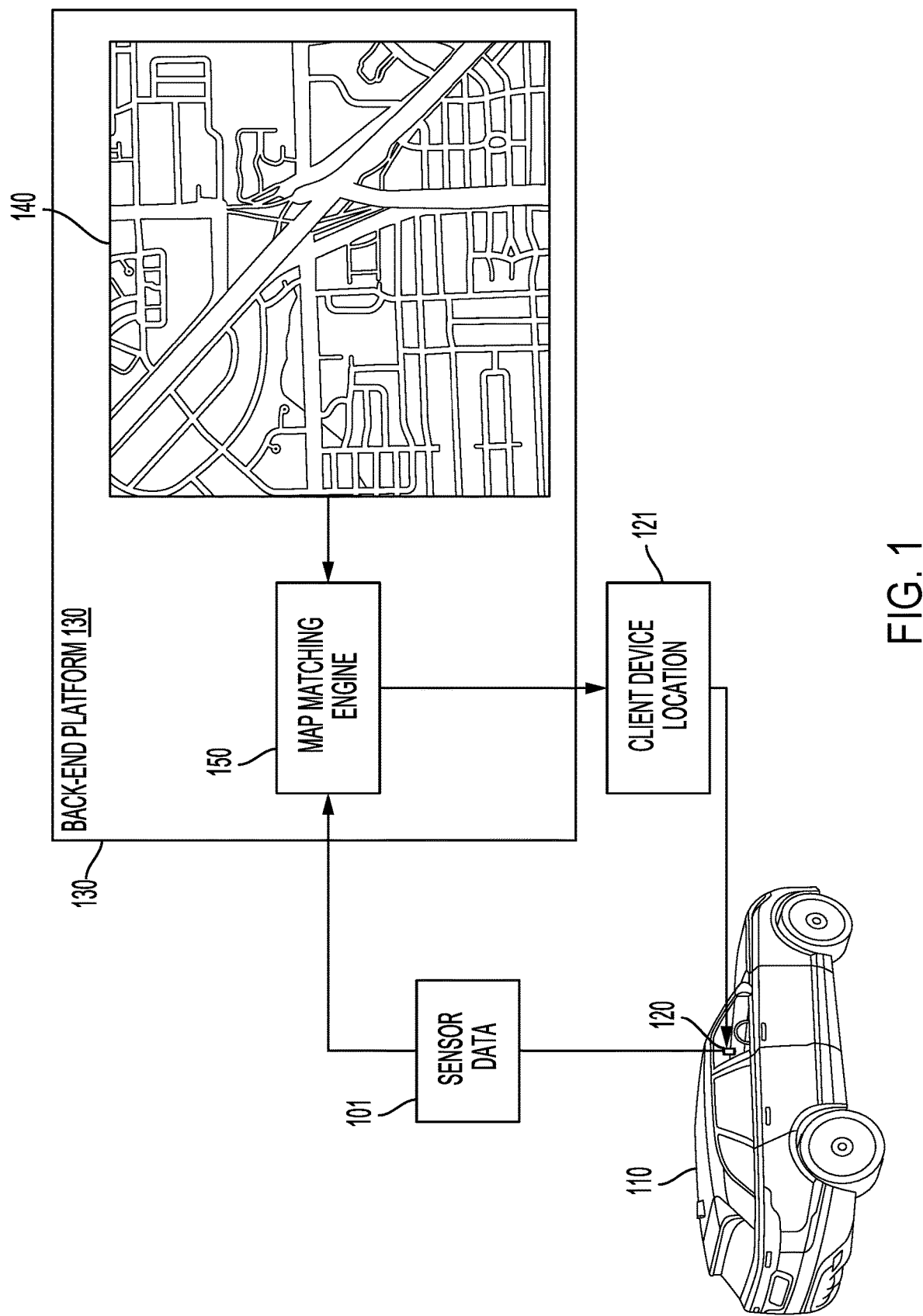
FIG. 1 is a diagram that illustrates one example of a back-end platform determining a location of a client device within a map maintained by the back-end platform.

As noted above, pre-encoded information about the world—which may be referred to herein as a map or map data—plays an important role in various areas of technology. For example, navigation applications running on client devices may use maps to perform various different operations, including but not limited to determining possible routes from a source location to a destination location in a mapped area, providing estimates of the time it will take to travel from the source location to the destination location along a possible route, and/or providing visualizations of a mapped area to users of the client devices. As another example, transportation-matching platforms (e.g., rideshare platforms) may use maps to perform various different operations, including but not limited to matching individuals with available vehicles in a mapped area, generating possible routes for vehicles to follow when picking up and/or transporting individuals in a mapped area, providing estimates of pickup and drop-off times in a mapped area, pre-positioning vehicles in a mapped area in anticipation of responding to transportation requests, and/or providing visualizations of a mapped area to users such as riders or drivers, among other possibilities. Maps may be used in various other areas of technology as well.

Typically, these types of maps will include pre-encoded information about the road network that is located within the mapped area, which facilitates many of the operations described above. In this respect, a road network located a mapped area may be logically broken down into a set of interconnected "road segments," each of which represents a discrete portion of the road network, and the pre-encoded information about the road network may then comprise a respective set of pre-encoded information for each of the road segments, which may take any of various forms depending on the map, the type of road segment, etc. As one example, the respective set of pre-encoded information for a road segment may include certain defining information for that road segment, such as a road-segment identifier, geo-spatial information (e.g., latitude and longitude coordinates) that indicates the road segment's location and geometry, and/or an indication of a type, category, or other classification of the road segment, among other possibilities. As another example, the respective set of pre-encoded information for a road segment may include information about certain types of road elements that may be found within or along the road segment, examples of which may include the number and direction of lanes in the road segment and how they inter-connect with other road segments, as well as semantic information for the road elements such as an indication of a speed limit (and changes to the speed limit), turning restrictions for a given lane at a given intersection, perhaps at different times of day, among other possibilities. The pre-encoded information about a road network that is included as part of a map may take various other forms as well.

As noted above, maps may be used to facilitate various transportation-related activities. In the context of a vehicle that is traversing the road network of a mapped area, this is generally accomplished by localizing a client device within the map using telematics data obtained from sensors of the client device. For example, a smartphone located in the vehicle may obtain telematics data (e.g., GPS data) that is used to determine the location of the smartphone, and thus the location of the vehicle, within the map. Once the location of the vehicle within the map is determined, the map may facilitate activities such as determining routes to navigate from one place to another and enabling transportation-matching services (which may also include a navigation component), among other possibilities.

As will be appreciated from the discussion above, the amount of pre-encoded information that may be contained within a given mapped area may be relatively large. This can make it difficult to maintain maps at individual client devices that tend to have limited processing and memory capabilities, which may be relied upon by various other functions and applications. Rather, the pre-encoded information defining the map is conventionally maintained by a back-end computing platform (e.g., one or more cloud-based computing devices) that is in communication with the client device.

In some cases, a client device might maintain an image or similar representation of a map that is geospatially aligned with a mapped area for purposes of visualization only. But such a representation may lack most or all of the underlying, pre-encoded information defining individual road segment locations, geometries, lane configurations, interconnections, etc. that define the road network, among other information.

Accordingly, existing approaches for determining a vehicle's location within a map are typically based on the assumption that the pre-encoded information defining the map (e.g., defining the road network) is not maintained by the client device. As one example, a client device may determine a rough approximation of its location based on telematics data obtained by the client device, such as GPS data. The client device may then use this data to determine the vehicle's location on the type of visual representation of the mapped area discussed above. However, this approach generally does not provide sufficient accuracy for most applications.

For instance, GPS data obtained by a conventional smartphone may have a margin of error of several meters under ideal conditions and may perform considerably worse under less ideal conditions (e.g., in an urban area surrounded by tall buildings). Further, because the visual representation of the mapped area does not include any underlying information defining the road network, there is no basis for the client device to refine the rough location of the vehicle in real time based on the map. For instance, the rough GPS location determined by the client device may indicate that the vehicle is inside a building, or in a lake, when the vehicle is actually driving on an adjacent road. Nonetheless, because there is no geospatial data available defining the adjacent road, the client device cannot determine that the vehicle is more likely to be in a location that corresponds to the road. As a result of these limitations, it may also be impractical for the client device to determine, based on GPS data alone, a route for the vehicle to follow from a source location to a destination location.

Another existing approach for determining a vehicle's location within a map may involve remotely determining a map-matched location of the vehicle on a back-end platform based on both map data maintained by the back-end platform and sensor data that is transmitted by a client device within the vehicle. An example of this type of approach is shown in FIG. 1, which shows a client device 120 located within a vehicle 110, thereby providing the basis for determining the location of the vehicle 110 with a map. FIG. 1 also shows a back-end platform 130 that maintains a map 140. In this regard, the map 140 may include all of the pre-encoded information related to the road network discussed above, among other information.

As the vehicle 110 traverses the road network, the client device 120 may periodically transmit obtained sensor data 101 (e.g., GPS data) to the back-end platform 130. As noted above, the sensor data 101 may provide only a rough estimate of the location of the client device 120. However, the back-end platform 130 may use the sensor data 101 in conjunction with the pre-encoded information about the road network in the map 140 to determine a more accurate location of the client device 120 within the map 140.

For example, the back-end platform 130 may include a map matching engine 150 that receives as input the sensor data 101, indicating the rough location of the client device, and determines in real time the most likely road segment within the map 140 on which the vehicle 110 is located. With reference to the example noted above, although the sensor data 101 might indicate a rough location for the client device 120 that is within a building or within a lake, the map matching engine 150 may identify an adjacent road within the road network of map 140 and snap the location of the client device 120 to the adjacent road. The back-end platform 130 may then send this determined location, shown in FIG. 1 as the client device location 121, back to the client device 120 (e.g., as updated GPS data). This may allow the client device 120 to display a more accurate representation of its location. Moreover, as additional sensor data 101 is received from the client device 120, the map matching engine 150 may improve its location determinations for the client device 120 using one or more statistical algorithms (e.g., a Hidden Markov Model (HMM), etc.).

In view of the above, the approach shown in FIG. 1 may have sufficient accuracy to facilitate operations such as determining a route for a vehicle to follow for navigation purposes and/or matching individuals with available vehicles for a transportation matching platform. For instance, the back-end platform 130 may additionally include a routing engine that receives as input the map-matched location for a given vehicle and then uses the map-matched location to determine a set of navigation instructions (also referred to herein as a route line) for the vehicle to follow. The route line may in turn be sent to the client device 120 for display via a navigation application. Similarly, the back-end platform 130 may include a transportation matching engine that receives the map-matched locations of numerous individuals and vehicles as input and makes matching and routing determinations based on those locations.

Nonetheless, the approach shown in FIG. 1 has several drawbacks. For instance, it will be appreciated that the usefulness of a vehicle's determined location within a map will decrease as the time between the sensor data capture and the location determination increases, particularly for a vehicle in motion. A location that is determined based on sensor data that was received by a client device several seconds in the past is less useful than a location that is determined based on more recent sensor data. In this regard, the approach shown in FIG. 1 involves an undesirable time lag in the determination of the vehicle's location.

This time lag may result in the determination of "stale" locations that can affect the activities discussed above in various ways. As one example in a navigation context, the back-end platform 130 may receive sensor data obtained by the client device 120 when the vehicle 110 is approaching an intersection, may accurately match the received sensor data to a corresponding location within the map 140, and may determine a route line for the vehicle 110 that involves the vehicle 110 making a turn at the intersection. However, by the time this information is received back at the client station 120, the vehicle 110 may have passed through the intersection, or may be too close to the intersection to safely perform the turn. Similar issues may arise if the vehicle 110 stops following a determined route line (e.g., due to missing a turn) and updated navigation instructions, also called a reroute, are needed relatively quickly. In these situations, there may be a delay before the map matching engine of the back-end platform 130 recognizes that the vehicle 110 is off of the determined route line, as well as a delay before the rerouting instruction is received back at the client device 120 from the routing engine. In some cases, this may result in missed opportunities to efficiently reroute the vehicle 110 back to the desired path.

As another example in a transportation matching context, the transportation matching engine of the back-end platform 130 may determine that it is highly efficient for the vehicle 110 to make a turn in order to pick up an individual that has requested a ride via a rideshare application. Accordingly, the back-end platform 130 may match the individual with the vehicle 110 and transmit an indication of a route line for the vehicle 110 to follow to pick up the individual. However, if the map-matched location of the vehicle 110 was not received by the transportation matching engine until after a delay, the vehicle 110 may have already passed the turn when it receives the route line to pick up the individual. Consequently, a reroute may be necessary that results in a substantially less efficient path to reach the individual, adding undesirable waiting time for the individual that is not in line with an expectation that may have been conveyed based on the initial, efficient route for the vehicle 110. Further, if a more current map-matched location of the vehicle 110 had been available, reflecting the less efficient path to the individual, the transportation matching engine may have determined a different vehicle that could have picked up the individual sooner.

Another drawback associated with the approach shown in FIG. 1 is that it is reliant on a network connection (e.g., a cellular network connection) to facilitate communication between the client device 120 and the back-end platform 130. Thus, the activities at the client device 120 discussed above that are supported by map-matching performed at the back-end platform 130 are subject to service interruptions and/or bad network connections, which may occur unpredictably and for various reasons. For instance, loss of connectivity during navigation may cause the client device 120 to resort to using a rough location that is based only on GPS data, and thus the vehicle 110 may appear to stray from a determined route line even though the vehicle 110 continues to follow the designated route. Further, if the vehicle 110 misses a route line turn while connectivity is lost, the client device 120 is without map data or a routing engine to reroute the vehicle 110 back toward the destination.

Existing approaches for determining a vehicle's location within a map may suffer from various other drawbacks as well.

In view of these and other shortcomings associated with existing approaches for locating a vehicle within a map, disclosed herein is new software technology that enables a client device within a vehicle to build a road network graph within a bounded area surrounding the vehicle and use the road network graph to locally determine an accurate location of the vehicle in real time, or near real time, using map matching.

At a high-level, the disclosed technology includes an on-client software component that causes a client device within a vehicle to iteratively run two parallel processes. The first process involves obtaining incremental portions of map data from a back-end platform on an as-needed basis based on raw sensor data (e.g., telematics data such as GPS data) for the client device. The second process involves determining a map-matched location of the client device, and thus the vehicle, based on the obtained map data and the raw sensor data for the client device.

With respect to the first process, the on-client software component may include a map generation pipeline that causes the client device to obtain incremental portions of map data around the vehicle's location and then assemble the obtained map data into a localized road network graph. For instance, the client device may first determine a rough approximation of the vehicle's location based on the client device's raw sensor data. Based on the rough location, the client device may identify portions of map data (e.g., map cells, discussed further below) that correspond to a pre-defined area-of-interest (AOI) around the vehicle and have not previously been obtained. The client device then transmits a request for the identified cells of map data to a back-end platform and, as a result of transmitting the request, receives the identified cells of map data. The client device can then assemble a road network graph for the AOI around the vehicle based on the map data contained within the received map cells.

Advantageously, the client device does not need to maintain the entirety of the pre-encoded information defining the map (e.g., the map 140 shown in FIG. 1) when using this approach. Rather, the client device can assemble a road network graph that is relatively small and is updated on an as-needed basis. As the vehicle traverses the road network, the road network graph assembled by the client device may be adjusted accordingly, incorporating map data from new map cells that enter the AOI around the vehicle and removing map data from map cells that are no longer within the AOI. Further, the client device may cache a certain amount of map data that is received from the back-end platform (e.g., up to a maximum number of cached map cells). In this way, if the vehicle is frequently traversing the same locations, the road network graph covering the AOI may be reassembled using map data that is already stored on the client device, reducing the need to request new map data from the back-end platform and providing additional resilience against network issues. Thus, the computational demand on the client device to maintain the assembled road network graph can remain relatively small, and moreover, relatively constant.

In addition, it will be appreciated that the communications involved in obtaining new map cells are not as time-sensitive as the communications with the back-end platform 130 discussed above with respect to FIG. 1. Rather, the client device will generally identify and request new map cells when they first enter the periphery of the AOI around the vehicle—i.e., when that portion of the assembled road network graph is farthest from the vehicle. Thus, any delay (s) in transmitting the request to the back-end platform for the map cells or in receiving the requested map cells back from the back-end platform may be less likely to cause issues.

With respect to the second process, the on-client software component may include a map-matching pipeline that causes the client device to determine a map-matched location of the client device within the assembled road network graph. For instance, the client device may use obtained raw sensor data to determine a set of "particles" corresponding to candidate road segments within the road network graph, where each particle includes a trajectory along the road network graph, current state data for the vehicle (e.g., position and velocity), and a current probability that the particle correctly represents the location of the vehicle. The client device may identify the particle having the highest probability and thereby determine a map-matched location for the client device, and thus the vehicle. When new sensor data is received, the client device may extend the particle trajectories along the road network graph, which may create new particles, and iteratively update the internal state and probability of each particle based on the new sensor data using one or more state estimation algorithms (e.g., a Kalman filter). At the end of each iteration, the client device identifies the particle with the highest probability and thereby determines a new map-matched location for the client device.

As a result, the disclosed software technology may provide various advantages over existing approaches. For instance, certain types of applications (e.g., on-client navigation applications) require a client device to have access to location data for a vehicle that is both accurate and available in real time without noticeable lag, which is not possible with existing approaches. By performing map matching locally on a client device within a vehicle, the disclosed technology provides a client device with a map-matched location that satisfies both of these goals.

Further, other types of applications (e.g., rideshare applications) require a back-end platform to continuously receive sensor data from a large number of vehicles and compute an accurate location for each vehicle based on the received sensor data. This process provides the basis to match individuals with available vehicles that are near their current location. By offloading the map matching processing to client devices within these vehicles, the disclosed technology may substantially reduce the extent of back-end computing resources that are required to determine these vehicle locations, which in turn reduces the effort and cost associated with providing such an application.

Figure 2:
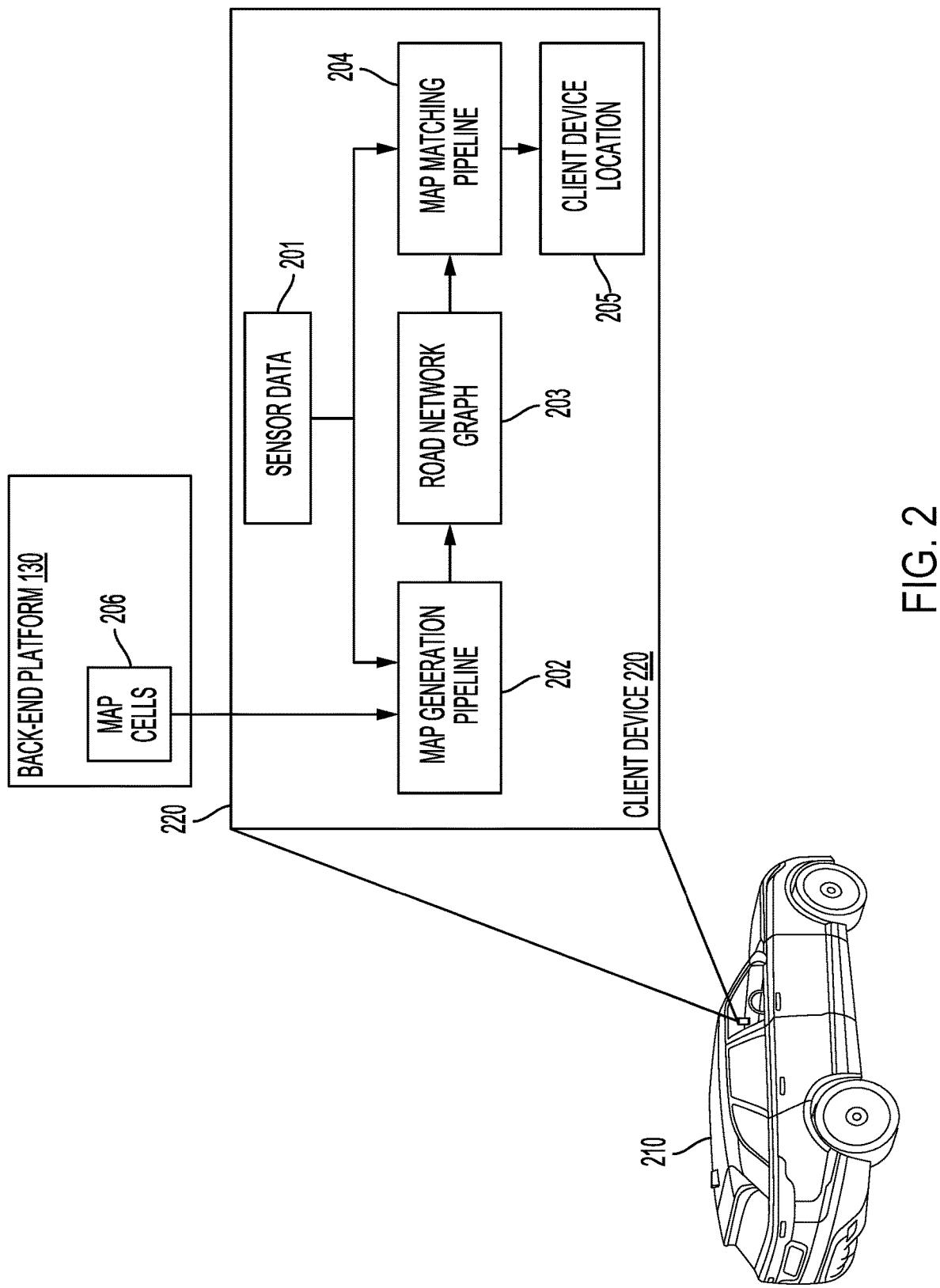
FIG. 2 is a diagram that illustrates one example of a client device determining its location within a road network graph generated by the client device.

FIG. 2 illustrates a schematic example of a client device determining a map-matched location according to this new approach. As shown in FIG. 2, a client device 220 may be located within a vehicle 210, similar to the client device 120 and vehicle 110 shown in FIG. 1. However, in FIG. 2 the client device 220 includes several components that enable the new techniques discussed herein. For instance, the client device 220 includes one or more software components that perform functions in a map generation pipeline 202, as generally discussed above. Accordingly, the client device 220 may request and receive map cells 206 from a back-end platform 230 on an as-needed basis based on received sensor data 201, as discussed above. The client device 220 may then use the map cells 206 to assemble a road network graph 203, which may be updated as the vehicle 210 traverses the road network and new sensor data 201 is received. The functions of the map generation pipeline 202 will be discussed in greater detail below with respect to FIG. 3.

Further, the client device 220 shown in FIG. 2 includes one or more software components that perform functions in a map matching pipeline 204, as generally discussed above. Accordingly, the client device 220 may use the received sensor data 201 and the road network graph 203 to determine a set of particles that correspond to possible trajectories on the road network graph 203 that the vehicle 210 may be following, as discussed above. The client device 220 identifies the particle with the highest probability and based on the identified particle, determines client device location 205 within the road network graph 203. The particles may be updated as the vehicle 210 traverses the road network and new sensor data 201 is received, and the updated particle with the highest probability may be identified after each iteration. The functions of the map matching pipeline 204 will be discussed in greater detail below with respect to FIG. 5.

As will be appreciated based on the above, this new approach for maintaining a limited road network graph on the client device 220 may reduce the client device's dependence on a reliable network connection to determine an accurate location. This may allow some operations that rely on an ongoing, accurate location of the client device 220 (e.g., navigation operations) to continue running even if the client device 220 temporarily loses service.

It should be understood that the disclosed software technology may provide other benefits as well, some of which will be discussed in further detail below.

Figure 3:
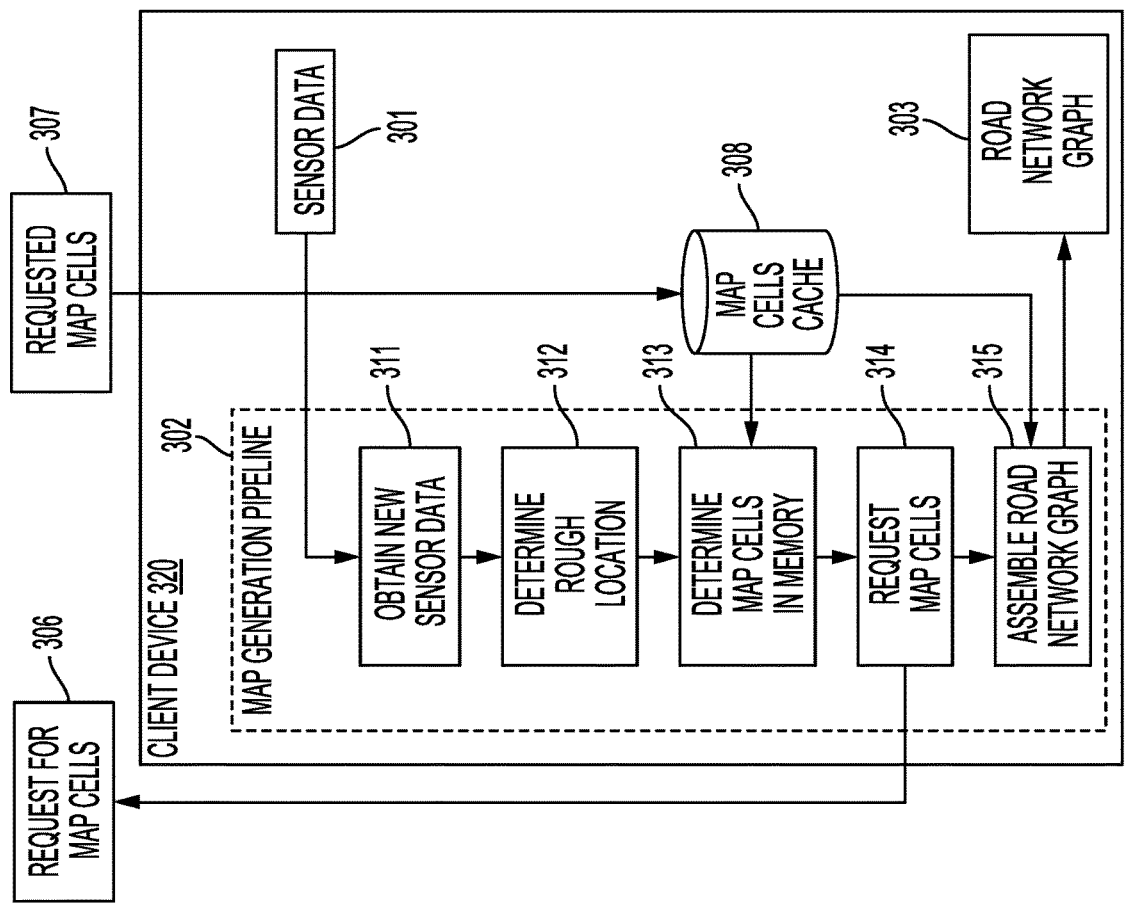
FIG. 3 is a diagram that illustrates one example of a map generation pipeline that is utilized by a client device to generate a road network graph.

Turning now to FIG. 3, one example of a client device 320 and an example data flow that incorporates the disclosed techniques of a map generation pipeline 302 will now be described. In this regard, the map generation pipeline 302 shown in FIG. 3 may generally correspond to the map generation pipeline 202 shown in FIG. 2. Further, the client device 320 may comprise any device that is capable of capturing telematics data and communicating with a back-end platform, such as the client devices 120 and 220 shown in FIG. 1 and FIG. 2. The client device 320 may take various forms. As one example, the client device 320 may be a standalone device that is capable of capturing telematics data and communicating with a back-end platform, such as a smartphone, tablet, or similar computing device that can be placed somewhere within a vehicle (e.g., by being mounted on a dashboard, windshield, or exterior body of a vehicle). As another example, the client device 320 may be integrated into a vehicle to capture telematics data and communicate with a back-end platform, such as a GPS sensor installed within the vehicle and coupled to one or more onboard computing devices that facilitate communications. The client device 320 may take other forms as well. One possible example of the components that may be included in a client device, such as the client device 320, is illustrated and described below with reference to FIG. 7.

At block 311 of the map generation pipeline 302, the client device 320 may obtain new sensor data 301 that was captured by one or more telematics sensors on the client device 320. For example, the client device 320 may include a GPS unit that captures GPS data that may be represented as a set of latitude and longitude (lat/long) values.

At block 312, based on the obtained sensor data 301, the client device 320 may determine a rough location for the vehicle in which the client device is located (e.g., the vehicle 210). As noted above, this type of rough location may have only medium to low accuracy, and may not support operations that require a more accurate, map matched location.

Figure 4A:
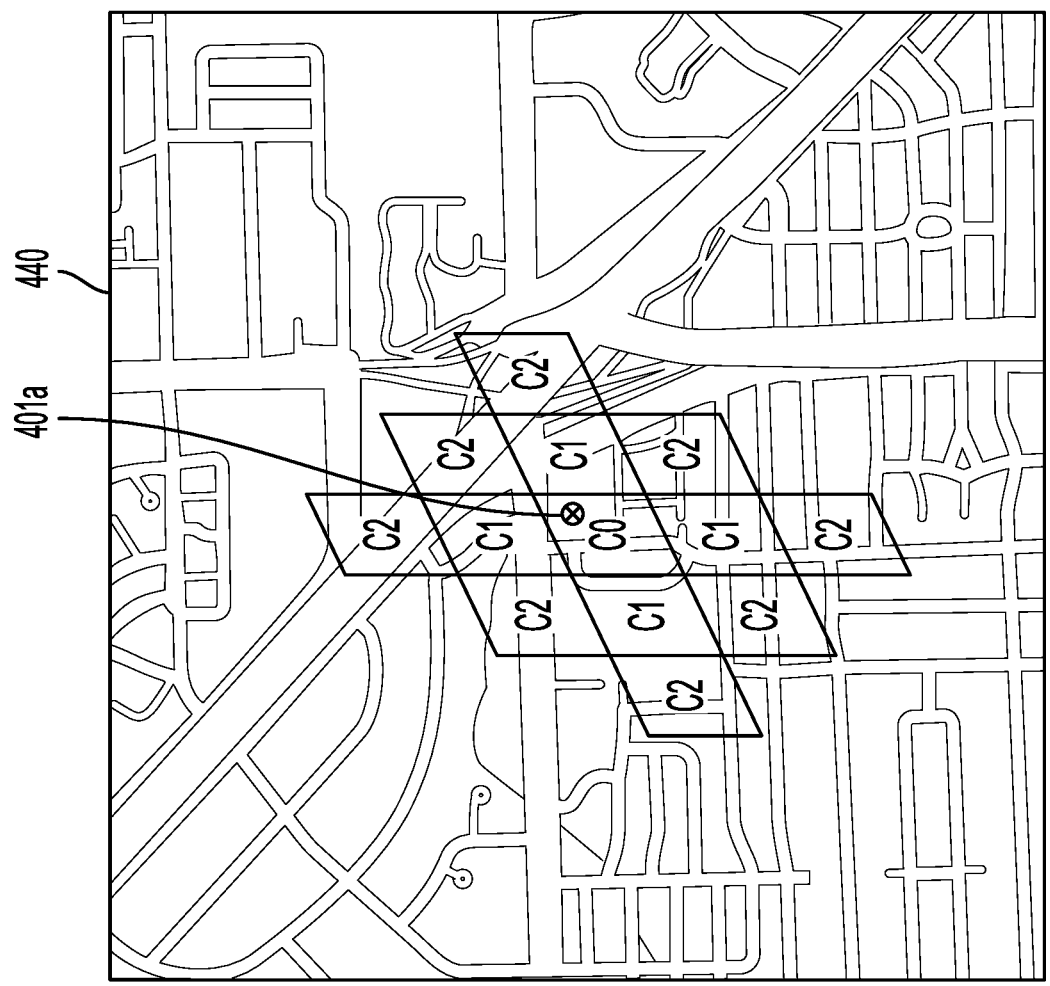
FIG. 4A is a diagram that illustrates one example of a set of cells utilized by a client device to generate a road network graph.
Figure 4B:
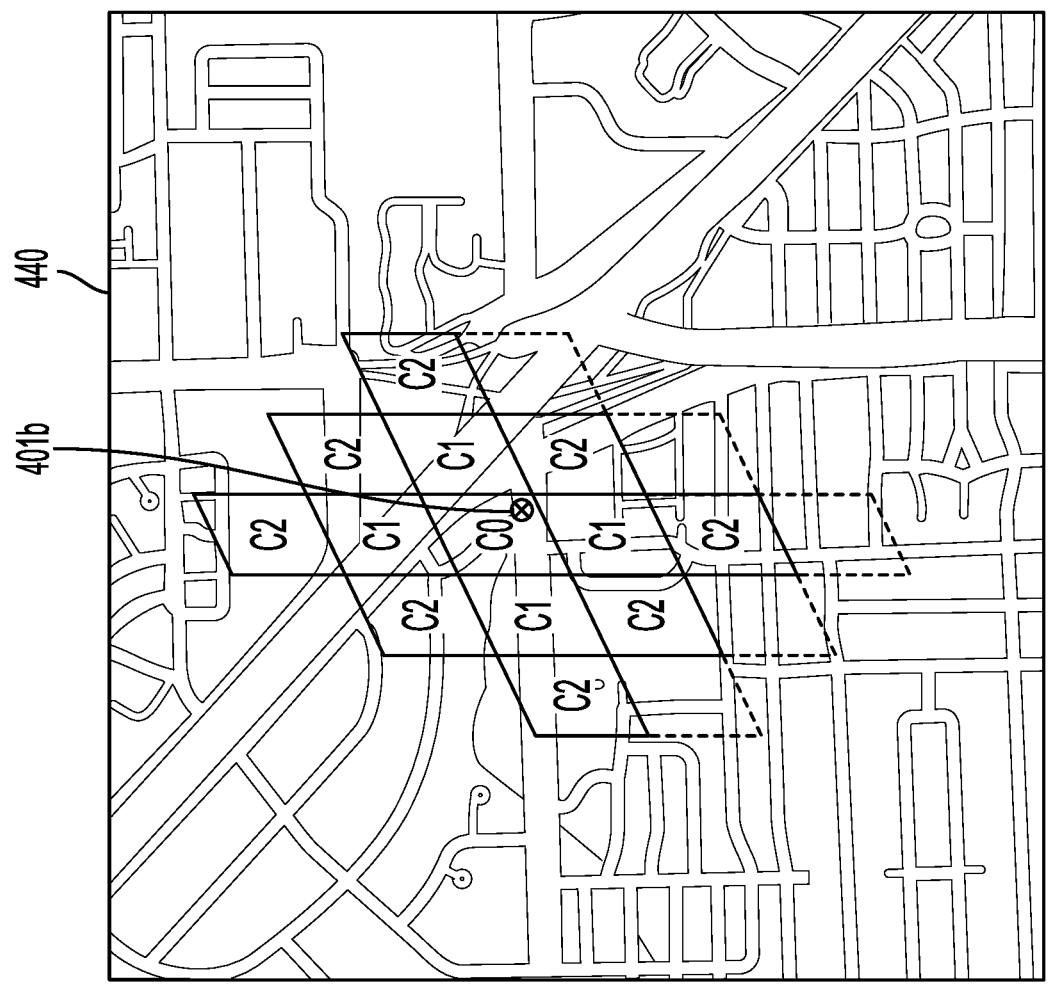
FIG. 4B is a diagram that illustrates one example of an updated set of cells utilized by a client device to generate a road network graph.

An example of the type of rough location that may be determined by the client device 320 is shown in FIGS. 4A-4B, which will be referred to in conjunction with FIG. 3 to illustrate certain aspects of the map generation pipeline 302. In FIG. 4A, a map 440 depicts a road network of a mapped area. As noted above, to the extent the road network and other features of the map 440 are represented on the client device 320, it may be an image or similar visual representation of the map 440 that is geospatially aligned with the mapped area, but which lacks the underlying, pre-encoded information defining the individual road segments that is maintained elsewhere by a back-end platform. Accordingly, the rough location 401a for the client device 320 may be represented at a given location on the visual representation of the map 440 based on the lat/long values from the obtained GPS data, which may or may not correspond to a location on any given road segment.

However, at least some of this underlying map data is needed for the client device 320 to determine its map-matched location. Thus, the client device 320 may define a limited area-of-interest surrounding the vehicle within which to obtain map data for assembling a similarly limited road network graph. To accomplish this, the client device 320 may maintain a relatively lightweight library that encodes a framework for dividing the map 440 into smaller, pre-defined areas. One example of such a framework is the commonly-known S2 cell geometry that is used to divide a unit sphere (e.g., the surface of the earth) into a hierarchy of cells. S2 cells at lower levels of the hierarchy (i.e., higher numbered cells) have smaller areas, such that each S2 cell at level 7 of the hierarchy contains four S2 cells at level 8, each of which contains four S2 cells at level 9, and so on. Further, if provided a lat/long location and a desired S2 level, an S2 library may return the cell ID number that contains the location. Various other frameworks for dividing the map 440 into smaller pre-defined areas are also possible.

In the example shown in FIGS. 4A-4B, the client device 320 may maintain an S2 library that defines S2 cells (e.g., by cell ID number) for a relatively large area that includes the map 440. Accordingly, the client device 320 is able to determine an S2 cell that contains the rough location 401*a*, as shown in FIG. 4A. In particular, the client device 320 has determined a level 13 cell and applied the label "C0" to the cell, which may serve as the center or origin cell of the client device's area-of-interest (AOI). Next, the client device 320 may determine, via the library, the S2 cells that neighbor cell C0 and apply a label of "C1" to those neighboring cells, which may be referred to herein as "first layer" cells in the AOI. Similarly, the client device 320 may determine, via the library, the S2 cells that neighbor the C1 cells and apply a label of "C2" to those neighboring cells, which may be referred to herein as "second layer" cells in the AOI.

The result of these operations is the 13-cell pattern shown in FIG. 4A, which may represent the AOI of the client device 320. Further, S2 cells at level 13 have edges that are approximately 1 km long on average, resulting in an AOI that extends for at least several kilometers in each direction away from the vehicle. However, it will be appreciated that the client device's AOI may be assembled in various other ways as well, using S2 cells of different levels and having more or few layers of neighboring cells.

Once the S2 cells making up the AOI are identified, the client device 320 may use this information to request map data (i.e., road network data) from the back-end platform for the areas within the identified S2 cells. In this regard, and to avoid confusion with the strictly geometric concept of an "S2 cell," the underlying map data that corresponds to the area defined by a given S2 cell is referred to herein as a "map data cell," or more simply a "map cell."

The example shown in FIG. 4A may represent a situation in which a client device 320 is located in a new geographic area and launches a navigation or rideshare application for the first time. As a result, the client device 320 has not previously requested any map cells in the area. With reference to block 313 of the map generation pipeline 302 (which will be discussed in further detail below) none of the map cells in the AOI are stored in memory.

Accordingly, at block 314 of the map generation pipeline 302, the client device 320 may request new map cells that correspond to the AOI shown in FIG. 4A. This request is shown in FIG. 3 as the block 306 and may be transmitted to the back-end platform that maintains the map 440. In response, the back-end platform may identify the map cells in the request (e.g., by referencing an S2 library similar to the S2 library maintained by the client device 320) and then transmit the requested map cells to the client device 320, shown as block 307 in FIG. 3.

When a given map cell is obtained by the client device 320, the client device 320 may store the map cell in a map cells cache 308. The map cells cache 308 may take various forms, such as a SQLite database in which the maps cells are stored along with an indication of their corresponding S2 cell ID for ease of reference. Other implementations of the map cells cache 308 are also possible.

At block 315 of the map generation pipeline 302, the client device 320 may assemble the road network graph 303 based on the requested map cells. The road network graph 303 may take various forms, such as an engine that exposes one or more application program interfaces (APIs) designed to carry out various map-related functions. The road network graph 303 may enable the client device 320 to undertake numerous location-dependent operations, many of which will be discussed below with reference to FIG. 5.

It will be appreciated that as the vehicle traverses the road network shown in FIG. 4A, the AOI around the vehicle must also be updated, along with the road network graph 303. Thus, the map generation pipeline 302 may run iteratively, returning to block 311 when new sensor data 301 is obtained by the client device 320. FIG. 4B illustrates one possible example of obtaining new sensor data 301 after the example shown in FIG. 4A.

As shown in FIG. 4B, the client device 320 has determined (e.g., at block 312) a rough location 401*b* based on the new sensor data 301 is shown in the map 440. Comparing FIG. 4A and FIG. 4B, it can be seen that the rough location 401*b* of the client device 320 has moved (e.g., to the north) relative to the rough location 401*a*. Accordingly, the client device 320 may determine a new origin cell C0—formerly a first layer C1 cell—that contains the rough location 401*b*. As above, the client device 320 may determine a set of neighboring first layer and second layer cells that constitutes the 13-cell AOI for the new location.

At block 313 of the map generation pipeline 302, the client device 320 may determine which of the map cells in the new AOI are already saved in memory. For instance, the client device 320 may query the map cells cache 308 by cell ID and determine that eight of the 13 cells in the AOI are already saved, while five of the 13 cells are not. Accordingly, the client device 320 may request (at block 314) the needed map cells from the back-end platform. The client device 320 may receive the requested map cells and store them in the map cells cache 308, as discussed above.

Returning to block 315, the client device 320 may once again assemble the road network graph 303. In this regard, the client device 320 will only load the map cells into the road network graph 303 that correspond to the now current AOI, while any map cells that were used to assemble the previous iteration of the road network graph 303, but are no longer within the AOI, are unloaded. In FIG. 4B, an example of these map cells are shown in dashed lines, and are no longer labeled as second layer cells within the AOI. In this way, the computational resources required to maintain the road network graph 303 can maintain relatively low, and moreover, relatively constant, both of which may be desirable if the computational resources of client device 320 are limited.

In addition, although the map cells that are no longer included in the AOI may be unloaded from the road network graph 303, they may not be immediately discarded from the map cells cache 308. Instead, the client device 320 may maintain the map cells in memory, where they may be used again if the vehicle returns to the same area of the map 440 and the map cells again appear in the AOI. In these situations, the client device 320 may determine (at block 313) that the map cells are already in memory, and thus may forego requesting them from the back-end platform. As a result, the road network graph 303 may be updated by loading and unloading map cells that are already stored on the client device 320.

The client device 320 may implement various different policies for maintaining map cells in the map cells cache 308. As one possibility, the client device 320 may impose a limit on the maximum number of map cells that may be saved (e.g., 1,000 map cells, 5,000 map cells, etc.). When the limit is reached, the client device 320 may begin deleting cells based on one or more criteria. For example, the client device 320 may begin deleting the oldest map cells, the least-recently loaded map cells, or the map cells that are located the farthest from the current location of the client device 320. Other possibilities also exist.

However, it will also be appreciated that map data may be subject to updates that may reflect changes to the road network, such as construction zones, road closures, newly created pickup and/or dropoff restrictions, and the like. When such map changes occur, some of the map cells stored in the map cells cache 308 may become outdated, as they do not reflect the changes. In view of this possibility, the client device 320 and/or the back-end platform may determine whether a given map cell is current or needs to be updated by sending a new version of the map cell to the client device 320. Further, to avoid continually redownloading map cells any time one of the cells in the map cells cache 308 is updated, the client device 320 and/or the back-end platform may only undertake a determination whether a map cell is current when it is determined to be in the AOI of the client device 320 and is going to be loaded into the road network graph 303.

The determination of a map cell's currentness may take various forms. As one possibility, each map cell that the client device 320 receives from the back-end platform may have an associated checksum of the map cell's contents. When the client device 320 determines that one or more map cells in a new AOI are already stored in memory, it may send an indication of the checksum for these map cells to the back-end platform. If the back-end platform determines that the checksum for the map cells has not changed, then the map cells have not been updated and the client device 320 has the current version. On the other hand, if the back-end platform determines that the checksum for a given map cell has changed, it will notify the client device 320 that a new version of the given map cell should be obtained. Alternatively, the back-end platform may provide the updated version of the given map cell to the client device 320 without providing a separate notification. Other examples are also possible.

As yet another possibility, the back-end platform may determine that all cached map cells, on all client devices, are out of date and need to be updated. For example, a new version of the map 440 may be rolled out, which may include formatting updates, additional features, and/or other map-wide changes that affect every map cell that a client device may have previously stored in its cache. Thus, the back-end platform may provide an instruction to the client device 320 to clear the map cells cache 308. Thereafter, the client device 320 may repopulate the map cells cache 308 by requesting the updated version of each map cell that was cleared. Alternatively, the client device 320 may request new map cells on an as needed basis, whenever it begins traversing the road network again. Other possibilities also exist.

In some situations, due to unforeseen circumstances such as network issues, client device connectivity issues, or the like, one or more map cells within the AOI may be unavailable. Further, these types of situations may be identifiable by the client device as it attempts to update the road network graph 302. Thus, rather than proceeding to use a model for determining a map matched location for the client device (e.g., an on-device model) that will eventually fail due to a lack of map data, and then trying to recover by shifting to another model at the time of failure, the client device 320 may establish a series of fallbacks that should be used based on the map cells that are available.

For example, the client device 320 may determine that the origin map cell C0 and all first layer C1 cells must be available to perform map matching on the client device 320. If, while attempting to obtain additional maps cells to update the road network graph, the client device 320 determines that one or both of these criteria are not met, the client device 320 may determine that an alternate model should be used. As one option, if the client device 320 has itself determined or otherwise received (e.g., from a back-end platform) a route line to follow that includes a series of road segments to follow that are defined by lat/long coordinates, the client device 320 may fall back to using a route line snapping model, which may be effective so long as the obtained sensor data does not stray too far from the route line.

As another option, if the client device 320 determines that it has insufficient map cells to assemble the road network graph and it does not currently have a route line to follow, the client device 320 may fallback to using a remote map matching model as discussed above and shown in FIG. 1. As yet another option, if the client device 320 determines that it has insufficient map cells to assemble the road network graph, no route line, and no connectivity to communicate with the back-end platform, the client device 320 may fall back to using raw GPS data to determine its location until one of the above becomes available.

Various other criteria (e.g., network status, client device connectivity, etc.) are also possible for determining whether and when to use one map-matching model over another.

Figure 5:
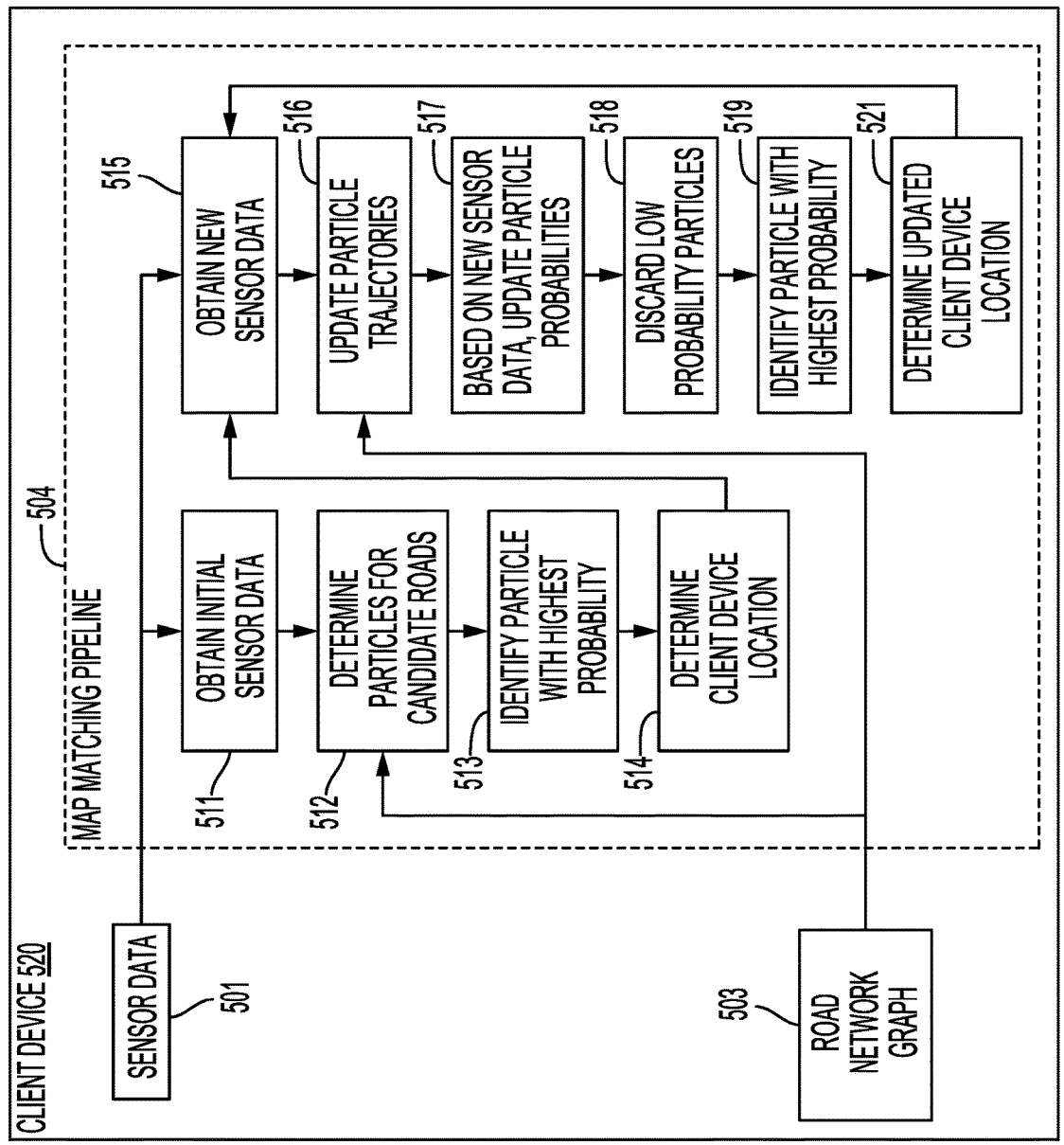
FIG. 5 is a diagram that illustrates one example of a map matching pipeline that is utilized by a client device to determine a location of the client device in a road network graph.

Turning now to FIG. 5, one example of a client device 520 and an example data flow that incorporates the disclosed techniques of a map matching pipeline 504 will now be described. In this regard, the map matching pipeline 504 shown in FIG. 5 may generally correspond to the map matching pipeline 204 shown in FIG. 2. Further, the client device 520 may be similar to, or the same as, the client device 320 shown in FIG. 3. In addition, FIGS. 6A-6C will be referred to in conjunction with the discussion of the map matching pipeline 504.

At block 511 of the map matching pipeline 504, the client device 520 may obtain initial sensor data 501 that was captured by one or more telematics sensors on the client device 520. As discussed above with respect to FIG. 3, the client device 520 may include a GPS unit that captures GPS data that may be represented as a set of latitude and longitude (lat/long) values. As shown in FIG. 5, block 511 may represent an initial sensor data capture that may be used to initialize the map matching pipeline 504. For instance, the initial sensor data 501 obtained at block 511 may be a first set of lat/long values obtained after the client device 520 starts up a navigation or rideshare application.

An example of this type of initialization is shown in FIG. 6A, which illustrates a vehicle 610 traversing a road network. As shown in FIG. 6A, initial sensor data has been obtained by a client device (e.g., client device 520) within the vehicle 610 and corresponds to the rough location 601a. The rough location 601a does not correspond to either of the road segments shown in FIG. 6A, as the initial sensor data generally has a medium to low degree of accuracy, as discussed above.

At block 512, the client device 520 may determine a set of particles that correspond to candidate road segments on which the client device 520 may be located. In this regard, the client device may reference a road network graph 503 that is maintained on the client device 520, which may be similar to or the same as the road network graph 303 discussed above with respect to FIG. 3. For instance, the road network graph 503 may be configured to return an indication of the nearest roads to a given location, such as the rough location 601*a*. The number of roads returned by the road network graph 503 may be a predetermined number (e.g., two nearest roads, ten nearest roads, etc.) and/or may be based on to a particular distance from the rough location (e.g., all roads within 30 meters, etc.).

In some implementations, as shown in the example of FIG. 6A, the road network graph 503 may return separate results for individual lanes on a given road that have opposite travel directions. Accordingly, client device 520 may determine an initial set of four particles 611-614 corresponding to candidate roads. In other implementations, the road network graph 503 may only return a single result for such roads. Other examples are also possible.

Each particle determined by the client device 520 will generally include three components. First, each particle includes a trajectory along a road segment within the road network graph 503. Second, each particle includes a set of state variables that represent attributes such as the position of the client device 520 (and thus the vehicle 610) on the trajectory, the velocity of the vehicle, covariance values (e.g., a measurement covariance matrix and a system covariance matrix), and GPS bias values, if applicable. Third, each particle includes a probability that the particle accurately reflects the location of the client device 520. Each of these components may be updated iteratively, for each particle, as additional sensor data is obtained by the client device 520 based on a prediction of the future state of each particle, as will be discussed further below.

However, in the initialization context shown in FIG. 6A, the client device 520 may assign the highest probability to the particle, and thus the corresponding road segment, that is closest to the rough location 601*a*. In this regard, each particle may be assigned an initial probability in proportion to how far its corresponding road segment is away from the rough location 601*a*. Accordingly, the client device 520 may determine, at block 513, that the particle with the highest probability is the particle 613.

At block 514, based on the identification of the particle 613, the client device 520 may determine the location of the client device 520, which is shown in FIG. 6A by snapping the location of the vehicle 610 to the road segment corresponding to the particle 613.

Thereafter, beginning at block 515, the map matching pipeline 504 may run iteratively based on the receipt of new sensor data 501. In this regard, the client device 520 may receive updated GPS data based on the sample rate of its GPS sensor, which may be on the order of 1 Hz (approximately once per second) in some implementations. Other sample rates are also possible.

A first iteration of the map matching pipeline 504 will now be described with respect to FIG. 6B, which may follow the example shown in FIG. 6A after new sensor data 501 is obtained. In particular, the client device 520 may obtain, at block 515, new sensor data that indicates the rough location 601*b* shown in FIG. 6B.

At block 516, after obtaining the new sensor data 501, the client device 520 may update the trajectory of each particle in the set of particles that was initially determined in FIG. 6A. Notably, this operation does not rely on the newly obtained sensor data 501 or the rough location 601*b* indicated by such sensor data. Rather, the trajectories may be extended geometrically based on the road network graph 503 in order to provide a basis for making future predictions of the state of the client device 520. As shown in FIG. 6B, each of the initially determined particles 611-614 now reflects an extended trajectory that follows the corresponding road segment for each particle. In this regard, each trajectory may be extended using the road network graph 503 out to a threshold distance (e.g., 400 meters) from the currently determined location of the client device 520.

At block 517, after the trajectories have been updated, and based on the new sensor data 501, the client device 520 may update the set of state variables and probability of each particle. This operation may take various forms and may involve using one or more state estimation algorithms. As one example, the client device 520 may utilize a type of Kalman filter (e.g., an unscented Kalman filter, an extended Kalman filter, etc.) to predict a future state of each particle— namely, a position along its trajectory, a velocity, and a probability-based on the prior state(s) of the particle, and then compare the predicted future state of each particle with the rough location 601*b* indicated by the newly obtained sensor data 501. Based on the comparison, the client device 520 then updates each particle accordingly.

An example of this is shown in FIG. 6B, where the predicted future state for each particle is shown. For instance, the initial sensor data obtained by the one or more telematics sensors on the client device 520 may include an indication of the vehicle's velocity (e.g., as a value in m/s). Thus, the predicted future state of the particle 613, currently assigned the highest probability, is shown by the estimated position 613*a*, representing the vehicle's predicted position along the trajectory 613, given its velocity. Similarly, the predicted future states of the lower probability particles 611, 612, and 614 are shown respectively by estimated positions 611*a*, 612*a*, and 614*a*.

In conjunction with updating the set of state variables for each particle, the client device 520 updates the probability of each particle to reflect how likely the rough location 601*b* is, given the predicted future states of each particle. As will be appreciated from a review of FIG. 6B, the particle 611 may be updated to have a relatively high probability, as its predicted future state is highly correlated with the rough location 601*b*, whereas the predicted future states of the other particles are not.

At block 518, after updating the probability of each particle in the set of particles, the client device 520 may discard particles whose probabilities are below a certain threshold (e.g., 0.1%, etc.). In the example shown in FIG. 6B, while the probabilities for particles 612, 613, 614 may have dropped substantially following the receipt of new sensor data represented by rough location 601*b*, they may not have crossed the threshold yet. However, as additional sensor data is obtained that continues to correspond to particle 611, each of these particles may eventually be discarded.

At block 519, client device 520 may identify the particle 611 as having the highest probability. Based on the identification of the particle 611, the client device 520 may determine the location of the client device 520 at block 521. For example, the location of the vehicle 610 may be snapped to the road segment corresponding to the particle 611.

As noted above, the state variables for each particle may include an indication of one or more GPS bias values, which may reflect the tendency of the raw sensor data obtained by the client device's GPS sensor(s) to be consistently inaccurate in one or both of the latitudinal or longitudinal directions. In the context of GPS sensor data obtained by the types of client devices contemplated herein (e.g., smartphones), GPS bias may be temporary and may be caused by any number of signal coverage or signal interference issues, among other possibilities. GPS bias may be detected and updated by the client device 520 in various ways. For example, the client device 520 may determine a series of map-matched locations for a vehicle on a given road segment, as generally discussed herein. Nonetheless, the corresponding series of rough locations derived from the raw GPS sensor data may consistently indicate that the vehicle is a few meters east of the map-matched road segment, which may correspond to an off-road trajectory that is unlikely to reflect the actual location of the vehicle. Thus, the client device 520 may determine that the obtained GPS sensor data is exhibiting a longitude bias of a given magnitude. Accordingly, this GPS bias may be tracked and reflected as a state variable for each particle in the Kalman filter to more accurately compare how the predicted future state of the particle compares to the rough vehicle location derived from the sensor data. When updating the state variables for each particle, the client device 520 may compare the rough locations corresponding to each new sensor data capture to the map-matched location of the vehicle to determine whether and by how much the GPS bias values change. In some implementations, GPS bias may be modeled as an Ornstein-Uhlenbeck process, which allows for random variations but tends to revert towards the mean, represented in this case as GPS bias values of zero. Other implementations for measuring GPS bias are also possible.

An additional iteration of the map matching pipeline 504 will now be described with respect to FIG. 6C in order to illustrate how the client device 520 may handle the determination of map matched locations where multiple branching trajectories are present within the road network graph 503.

As shown in FIG. 6C, extending a trajectory for a particle (e.g., at block 516) along a given road segment will eventually reach a point where the trajectory meets an intersection and there are multiple, competing possibilities for how the trajectory may be extended. In these situations, the computing device 520 will generate a new particle for each possible trajectory and divide the probability among the new particles proportionally. For example, assuming for simplicity that the probability of the current particle for vehicle 610 is 100% before the trajectory is extended through the upcoming intersection shown in FIG. 6C, the probability associated with the first three branches may be divided ⅓ each. Thus, both the particle 615, representing a trajectory that passes straight through the intersection, and the particle 616, representing a trajectory that makes a right turn at the intersection, may be assigned a probability of 33.3%. Similarly, the left turn at the intersection may divide again into two separate particles, which may each be assigned half of the ⅓ probability assigned to the left turn, or ⅙. Thus, both the particle 617, representing a trajectory that proceeds straight after turning left at the intersection, and the particle 618, representing a trajectory that makes a right turn after turning left at the intersection, may be assigned a probability of 16.6%.

In the situation shown in FIG. 6C, some or all of the particles 615-618 may initially have the same probability, even after the client device 520 receives new sensor data represented by the rough location 601c. Nonetheless, this may not have an appreciable effect on the map matched location of the vehicle 610, as it would be located on the same road segment in any event. However, as the vehicle 610 approaches the intersection and additional sensor data is obtained, as represented by rough locations 601d, 601e, and 601f, the probabilities may begin to shift (e.g., at block 517 of the map matching pipeline). For example, the Kalman filter may incorporate a physical model for the vehicle 610 that reflects a vehicle's tendency to slow down when it is going to make a turn. Thus, the predicted states for the particle 616 and the particles 617 and 618 may incorporate this change in velocity, whereas the predicted state for the particle 615 may not. Accordingly, as the rough locations based on obtained sensor data become more closely spaced together, the probability of these particles may increase, while the probability of particle 615 may decrease. A similar effect may be observed as the obtained sensor data represented by rough locations 601g and 601h starts to drift to the left, which may increase the probability of the particles 617 and 618, and so on.

Figure 7B:
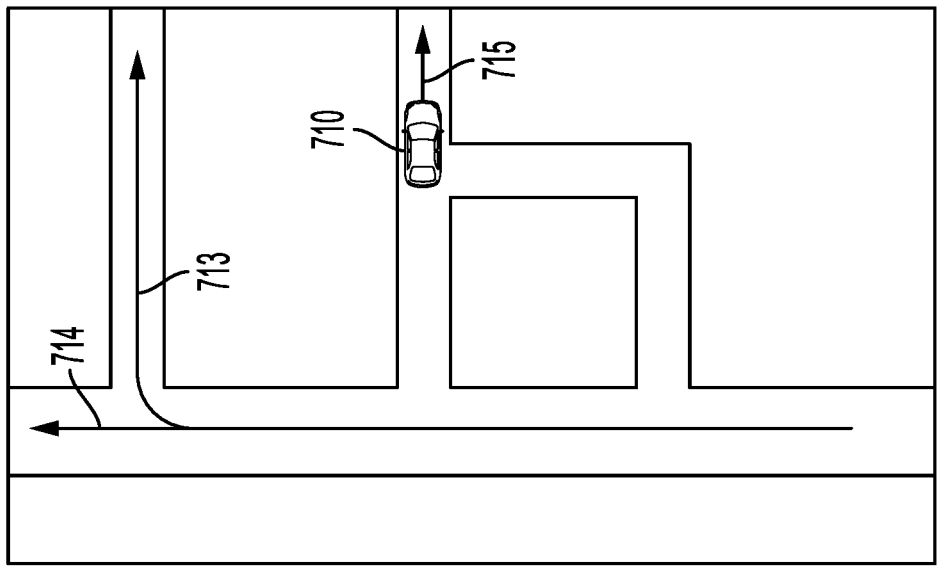
FIG. 7B is a diagram that illustrates an example of coalescing particles determined by a client device.
Figure 7A:
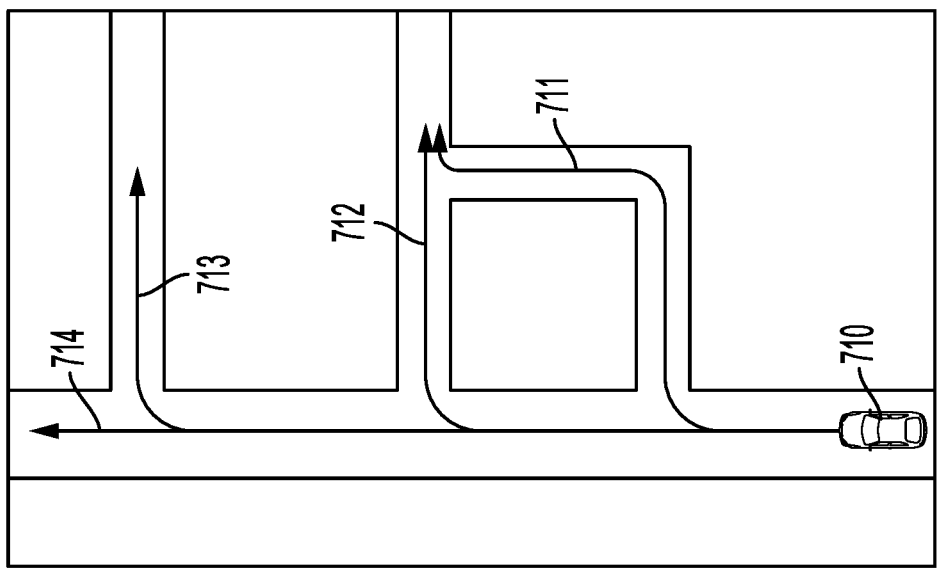
FIG. 7A is a diagram that illustrates another example of a set of particles determined by a client device.

Turning now to FIGS. 7A-7B another example is shown that illustrates an additional feature of the disclosed technology that may be utilized when a given road network graph includes branching road segments that converge into the same trajectory. For instance, the vehicle 710 shown in FIG. 7A is traversing a road network that presents four branching particles 710, 711, 712, and 713, two of which lead back to the same location. Initially, a client device within vehicle 710, such as the client device 520 shown in FIG. 5, may treat each of these particles separately and assign them each their own respective probabilities, to account for the possibility that the vehicle 710 might follow any one of the separate trajectories shown.

However, if the vehicle 710 advances to the location where the trajectories of particles 711 and 712 reconverge, as shown in FIG. 7B, the client device 520 may coalesce the two particles into a single particle 715. For example, the client device 520 may coalesce converging particles as part of the map matching pipeline 504 at block 518, in conjunction with discarding low probability particles as discussed above. Advantageously, coalescing particles in this way may result in merging the probabilities of particles 711 and 712, which may prevent errors that might otherwise result when identifying the particle with the highest probability at block 519. Moreover, coalescing particles allows the client device 520 to reduce the number of particles that must be updated and considered by the Kalman filter for each iteration of the map matching pipeline 504. In this regard, a coalesced particle that results from two or more converging particles may be treated as an entirely new particle, replacing the converging particles. Alternatively, the coalesced particle may be selected from the converging particles (e.g., the particle with the highest probability at the time of convergence), discarding the rest. Various other implementations for coalescing particles are also possible, including a combination of the above.

Figure 8B:
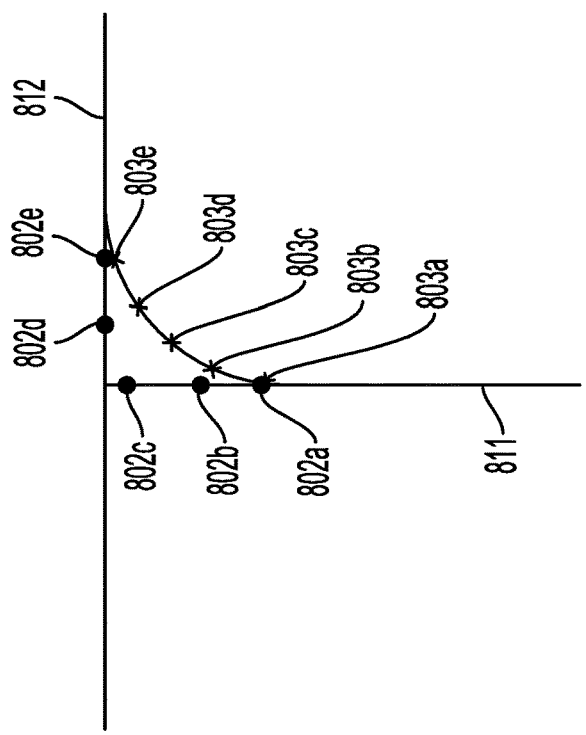
FIG. 8B is a diagram that illustrates an example turn interpolation determined by a client device.
Figure 8A:
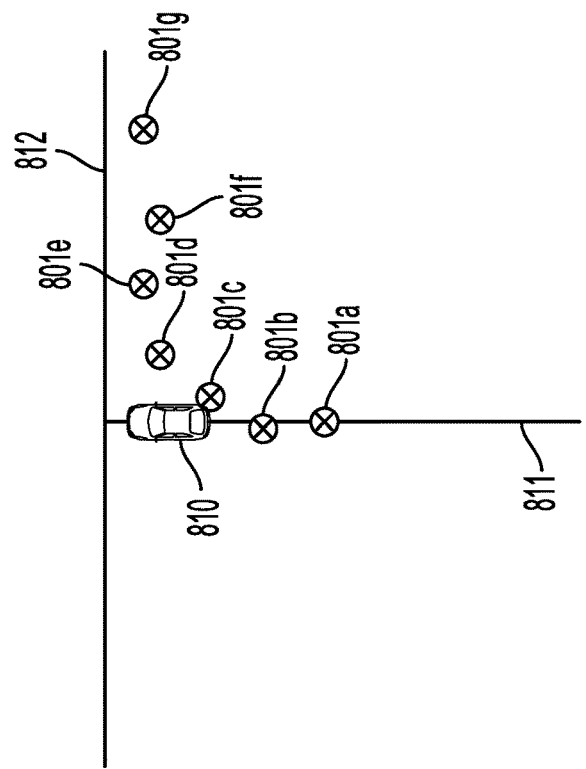
FIG. 8A is a diagram that illustrates an example set of rough locations determined by a client device in a vehicle making a turn.

Yet another feature that may be implemented by the disclosed technology to improve the accuracy of map-matched locations for a vehicle involves the quadratic interpolation of turns, which is illustrated in FIGS. 8A-8B. In some situations, the map matching pipeline as discussed above may have temporary difficulty accurately locating a vehicle when the vehicle makes a turn. As shown in FIG. 8A, this may occur when the rough locations 801a-801g derived from the raw sensor data "shortcut" the turn at a point before the vehicle has reached the junction of the road segment 811 with the road segment 812, each of which might be represented by only a single line (e.g., a centerline of a lane). This issue may be compounded if the GPS sensor data is exhibiting a bias that makes it appear the vehicle's location stopped advancing short of the intersection and instead began to move laterally. In these situations, the client device 520 may not recognize that advancing the vehicle's location on a trajectory into the intersection—which initially appears to move the vehicle further away from the rough locations—will eventually lead to a more accurate trajectory on road segment 812 that is closer to the rough locations. This effect may be especially pronounced in scenarios where a vehicle makes a turn that is sharper than 90 degrees. In these cases, the client device 520 may actually try to move the location of the vehicle away from the intersection (i.e., backwards), rather than moving it first into the intersection and then through the turn.

To address these issues, the client device 520 may interpolate between the road segments 811 and 812 to add curvature to the turn, as shown in FIG. 8B. For instance, the client device 520 may use a quadratic spline to interpolate points (e.g., points 803*a*-803*e*) defining a curve that connects road segments 811 and 812. As one example, the spline may begin 20 meters from the junction of road segments 811 and 812 and may end the same distance after the junction. Other distances and geometries are also possible. The interpolated points may be used to estimate the position of the vehicle in lieu of corresponding points that lie directly on the road segments (e.g., points 802*a*-802*e*). Accordingly, when the client device 520 determines a predicted future position of the vehicle at block 517 of the map matching pipeline 504, it may predict a position that lies along the interpolated spline. As will be appreciated by comparing FIG. 8A with FIG. 8B, this may allow the client device 520 to recognize that advancing the location of the vehicle to a predicted position along the interpolated trajectory will move the vehicle closer to the rough locations obtained from sensor data. Other implementations for interpolating the geometry between road segments are also possible. Based on the foregoing examples, it will be appreciated that the client device 520 may be able to determine an ongoing and accurate map matched location that snaps the location of the client device 520 to road segments in the road network graph 503 without the need for significant communications with a back-end platform.

Additionally, the client device 520 may be capable of determining a route line from one point to another within the road network graph 503 for purposes of navigation without communicating with the back-end platform. Similarly, the client device 520 may be capable of demining the shortest path back to a previously determined route line, in situations where a turn was missed and the vehicle needs to be rerouted. Moreover, each of these routing capabilities may benefit from the improved speed with which the location of the vehicle may be determined, mitigating one of the shortcomings of existing approaches discussed above.

Still further, for navigation tasks that extend beyond the currently assembled road network graph, the client device 520 may be capable of determining a route line without communicating with the back-end platform using map data that is stored in its cache. For example, upon receiving a navigation request, the client device 520 may determine that the destination point is located within the cached map data. The client device 520 may then assemble a road network graph that is large enough to encompass the entire route from the origin to the destination. Other examples for how the client device 520 may determine a route using cached map data that is not currently part of the assembled road network graph are also possible. In line with the discussion above, this type of approach may be implemented as a default navigation process, or as a fallback in situations where the client device 520 has lost connectivity with the back-end platform, among other possibilities.

The new software technology disclosed herein may provide numerous other benefits as well.

Figure 9:
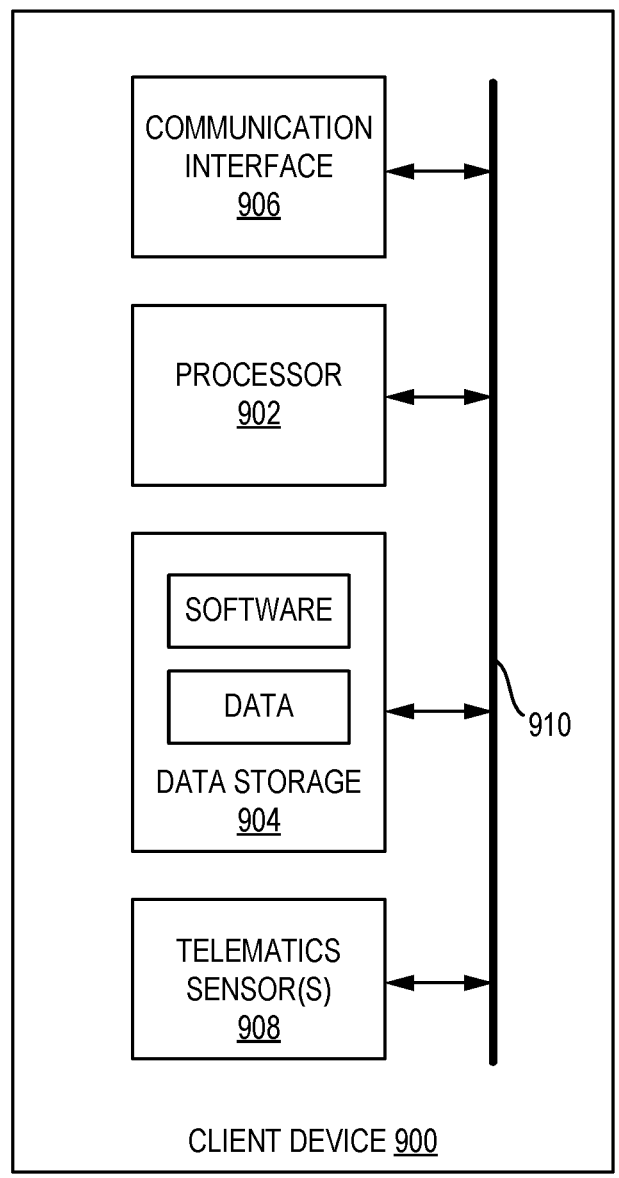
FIG. 9 is a simplified block diagram that illustrates some structural components that may be included in an example client device.

Turning now to FIG. 9, a simplified block diagram is provided to illustrate some structural components that may be included in an example client device 900, which may be configured to carry out any of the various functions disclosed herein. At a high level, client device 900 may include a processor 902, data storage 904, a communication interface 906, and one or more telematics sensors 908, all of which may be communicatively linked by a communication link 910 that may that various forms, one example of which is a system bus.

Processor 902 of client device 900 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Data storage 904 of client device 900 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor 902 of client device 900 such that client device 900 is configured to perform various functions related to the generation of a road network graph and determining map matched locations for the client device 900 within the road network graph (among other possible functions), and (ii) map cells requested and received from a back-end computing platform, among other possibilities.

Telematics sensor(s) 908 of the client device 900 may include a Global Navigation Satellite System (GNSS) unit such as a GPS unit and/or an inertial measurement unit or IMU (which may be comprised of accelerometers, gyroscopes, and/or magnetometers), among other possibilities. In this respect, the telematics sensor(s) 908 of client device 900 may be configured to capture telematics data at a particular rate, depending on the sensor (e.g., one time per second, fifty times per second, etc.).

Communication interface 910 of client device 900 may take the form of any one or more interfaces that facilitate communication with a back-end platform, such as the back-end platform 230 shown in FIG. 2, and/or other remote computing systems (e.g., a transportation-matching system), among other possibilities. In this respect, each such interface may be wired and/or wireless and may communicate according to any of various communication protocols, examples of which may include radio access network (e.g., cellular network), Wi-Fi, and/or wide area network (e.g., Internet).

Figure 10:
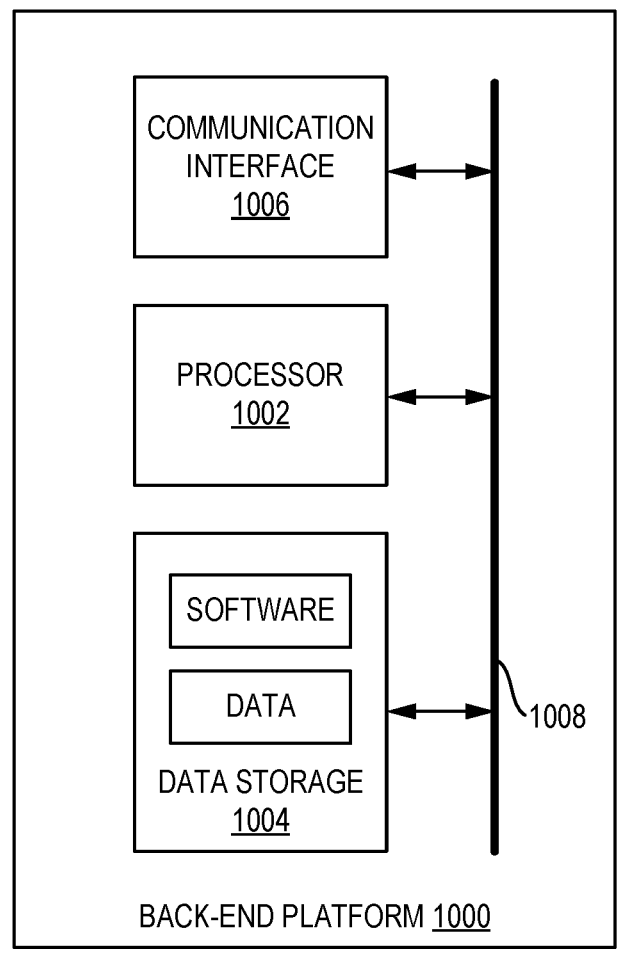
FIG. 10 is a simplified block diagram that illustrates some structural components that may be included in an example back-end platform.

Turning now to FIG. 10, a simplified block diagram is provided to illustrate some structural components that may be included in an example back-end platform 1000, which may be configured to carry out any of the various functions disclosed herein. At a high level, the back-end platform 1000 may generally comprise any one or more computing systems (e.g., an on-board vehicle computing system and/or one or more off-board servers) that collectively include at least a processor 1002, data storage 1004, and a communication interface 1006, all of which may be communicatively linked by a communication link 1008 that may take the form of a system bus, a communication network such as a public, private, or hybrid cloud, or some other connection mechanism. Each of these components may take various forms.

The one or more computing systems of the back-end platform 1000 may take various forms and be arranged in various manners. For instance, as one possibility, back-end platform 1000 may comprise one or more dedicated servers that have been installed with back-end software for maintaining map data, processing routing and/or transportation matching requests from client devices (e.g., client device 320 described above with respect to FIG. 3, client device 520 described above with respect to FIG. 5, etc.), and communicating with the client devices, among other possibilities. As another possibility, back-end platform 1000 may comprise computing infrastructure of a public, private, and/or hybrid cloud (e.g., computing and/or storage clusters) that has been installed with the back-end software. In this respect, the entity that operates the back-end platform 1000 may either supply its own cloud infrastructure or may obtain cloud infrastructure from a third-party provider of "on demand" computing resources, such as Amazon Web Services (AWS) or the like. Other implementations of back-end platform 1000 are possible as well.

Processor 1002 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 1002 could comprise processing components that are distributed across a plurality of physical computing devices connected via a network, such as a computing cluster of a public, private, or hybrid cloud.

In turn, data storage 1004 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 1004 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 10, data storage 1004 may be capable of storing both (i) program instructions that are executable by processor 1002 such that the back-end platform 1000 is configured to perform any of the various functions disclosed herein (including but not limited to any the functions ascribed to a back-end platform with reference to FIGS. 2-5), and (ii) data that may be received, derived, or otherwise stored by the back-end platform 1000.

Communication interface 1006 may take the form of any one or more interfaces that facilitate communication between the back-end platform 1000 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

Although not shown, the back-end platform 1000 may additionally include one or more input/output (I/O) interfaces that are configured to either (i) receive and/or capture information at the back-end platform 1000 and (ii) output information from the back-end platform 1000 (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that the back-end platform 1000 is one example of a computing platform that may be used with the embodiments described herein. Numerous other arrangements are possible and contemplated herein. For instance, other computing platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:
1. A method implemented by a client device, the method comprising:
    obtaining initial sensor data that is indicative of a location of the client device at a first time;
    based on the initial sensor data and a road network graph maintained on the client device, determining a set of particles corresponding to candidate road segments within the road network graph, wherein each particle comprises (i) a respective candidate trajectory of the client device along a respective candidate road segment within the road network graph, (ii) a respective candidate position and velocity of the client device along the respective candidate trajectory, and (iii) a respective probability that the particle accurately reflects the location of the client device within the road network graph at the first time;
    identifying a particle from the set of particles with a highest probability;
    based on the identified particle from the set of particles with the highest probability, determining the location of the client device within the road network graph at the first time;
    obtaining new sensor data that is indicative of a location of the client device at a second time;
    after obtaining the new sensor data, creating a first updated set of particles by updating each particle in at least a subset of the set of particles to include:

(i) a respective updated candidate trajectory that comprises an extension of the respective candidate trajectory that was previously included in the particle;
(ii) a respective updated candidate position and velocity of the client device along the respective updated candidate trajectory; and
(iii) a respective updated probability that the particle accurately reflects the location of client device within the road network graph at the second time;
identifying a particle from the first updated set of particles with a highest probability; and
based on the identified particle from the first updated set of particles with highest probability, determining the location of the client device within the road network graph at the second time.

2. The method of claim 1, further comprising:
determining that one or more particles in the first updated set of particles has a respective updated probability that is below a minimum threshold; and
based on determining that the one or more particles in the first updated set of particles has the respective updated probability that is below a minimum threshold, removing the one or more particles from the first updated set of particles.

3. The method of claim 1, wherein creating the first updated set of particles further involves:
for a given particle in the first set, determining that, when extended, the respective candidate trajectory that was previously included in the particle meets an intersection of road segments in the road network graph, wherein each road segment corresponds to a possible extension of the respective candidate trajectory through the intersection;
based on determining that, when extended, the respective candidate trajectory that was previously included in the particle meets the intersection of road segments in the road network graph, determining at least one new particle for each possible extension of the respective candidate trajectory through the intersection; and
adding the new particles to the first updated set of particles.

4. The method of claim 1, further comprising,
receiving, via a user interface of the client device, a routing request;
based on the determined location of the client device within the road network graph at the first time, determining a route line indicating a sequence of road segments to be followed in response to the routing request; and
wherein the respective updated probability included in a given particle in the first updated set of particles comprises an increased probability included in the given particle based on a determination that the given particle corresponds to the route line.

5. The method of claim 1, wherein determining the location of the client device within road network graph at the second time comprises snapping the location to a road segment corresponding to the identified particle from the first set of updated particles with highest probability.

6. The method of claim 1, further comprising:
based on the initial sensor data, determining a first approximation of the location of the client device at the first time;
determining a set of map cells centered on the first approximation of the location of the client device at the first time;

determining that at least one map cell in the set of map cells is not stored in memory of the client device;
receiving the at least one map cell from a back-end platform; and
assembling the road network graph using the set of map cells, wherein the set of map cells includes the at least one map cell received from the back-end platform.

7. The method of claim 6, wherein determining the set of map cells centered on the first approximation of the location of the client device at the first time comprises determining the set of map cells within a predetermined distance of the first approximation of the location of the client device at the first time.

8. The method of claim 6, wherein the new sensor data is first new sensor data, and wherein set of map cells is a first set of map cells, the method further comprising:
obtaining second new sensor data;
based on the second new sensor data, determining a second approximation of the location of the client device at the second time;
determining a second set of map cells centered on the second approximation of the location of the client device at the second time;
determining that at least one map cell in the second set of map cells is unavailable; and
based on determining that at least one map cell in the second set of map cells is unavailable, discontinuing using the road network graph to determine locations of the client device.

9. The method of claim 8, further comprising:
based on determining that at least one map cell in the second set of map cells is unavailable, transmitting third new sensor data to the back-end platform to determine an location of the client device.

10. A client device comprising:
at least one processor;
a non-transitory computer-readable medium; and
program instructions stored on the non-transitory computer-readable medium that are executable by the at least one processor such that the client device is configured to:
obtain initial sensor data that is indicative of a location of the client device at a first time;
based on the initial sensor data and a road network graph maintained on the client device, determine a set of particles corresponding to candidate road segments within the road network graph, wherein each particle comprises (i) a respective candidate trajectory of the client device along a respective candidate road segment within the road network graph, (ii) a respective candidate position and velocity of the client device along the respective candidate trajectory, and (iii) a respective probability that the particle accurately reflects the location of the client device within the road network graph at the first time;
identify a particle from the set of particles with a highest probability;
based on the identified particle from the set of particles with the highest probability, determine the location of the client device within the road network graph at the first time;
obtain new sensor data that is indicative of a location of the client device at a second time;
after obtaining the new sensor data, create a first updated set of particles by updating each particle in at least a subset of the set of particles to include:

(i) a respective updated candidate trajectory that comprises an extension of the respective candidate trajectory that was previously included in the particle;
(ii) a respective updated candidate position and velocity of the client device along the respective updated candidate trajectory; and
(iii) a respective updated probability that the particle accurately reflects the location of client device within the road network graph at the second time;
identify a particle from the first updated set of particles with a highest probability; and
based on the identified particle from the first updated set of updated particles with highest probability, determine the location of the client device within the road network graph at the second time.

11. The client device of claim 10, further comprising program instructions stored on the non-transitory computer-readable medium that are executable by the at least one processor such that the client device is configured to:
determine that one or more particles in the first updated set of particles has a respective updated probability that is below a minimum threshold; and
based on determining that the one or more particles in the first updated set of particles has the respective updated probability that is below a minimum threshold, remove the one or more particles from the first updated set of particles.

12. The client device of claim 10, wherein the program instructions that are executable by the at least one processor such that the client device is configured to create the first updated set of particles comprise program instructions that are executable by the at least one processor such that the client device is configured to:
for a given particle in the first set, determine that, when extended, the respective candidate trajectory that was previously included in the particle meets an intersection of road segments in the road network graph, wherein each road segment corresponds to a possible extension of the respective candidate trajectory through the intersection;
based on determining that, when extended, the respective candidate trajectory that was previously included in the particle meets the intersection of road segments in the road network graph, determine at least one new particle for each possible extension of the respective candidate trajectory through the intersection; and
add the new particles to the first updated set of particles.

13. The client device of claim 10, further comprising program instructions stored on the non-transitory computer-readable medium that are executable by the at least one processor such that the client device is configured to:
receive, via a user interface of the client device, a routing request;
based on the determined location of the client device within the road network graph at the first time, determine a route line indicating a sequence of road segments to be followed in response to the routing request; and
wherein the respective updated probability included in a given particle in the first updated set of particles comprises an increased probability included in the given particle based on a determination that the given particle corresponds to the route line.

14. The client device of claim 10, wherein the program instructions that are executable by the at least one processor such that the client device is configured to determine the location of the client device within road network graph at the second time comprise program instructions that are executable by the at least one processor such that the client device is configured to snap the location to a road segment corresponding to the identified particle from the first set of updated particles with highest probability.

15. The client device of claim 10, further comprising program instructions stored on the non-transitory computer-readable medium that are executable by the at least one processor such that the client device is configured to:
based on the initial sensor data, determine a first approximation of the location of the client device at the first time;
determine a set of map cells centered on the first approximation of the location of the client device at the first time;
determine that at least one map cell in the set of map cells is not stored in memory of the client device;
receive the at least one map cell from a back-end platform; and
assemble the road network graph using the set of map cells, wherein the set of map cells includes the at least one map cell received from the back-end platform.

16. The client device of claim 15, wherein the program instructions that are executable by the at least one processor such that the client device is configured to determine the set of map cells centered on the first approximation of the location of the client device at the first time comprise program instructions that are executable by the at least one processor such that the client device is configured to determine the set of map cells within a predetermined distance of the first approximation of the location of the client device at the first time.

17. The client device of claim 15, wherein the new sensor data is first new sensor data, and wherein set of map cells is a first set of map cells, the client device further comprising program instructions stored on the non-transitory computer-readable medium that are executable by the at least one processor such that the client device is configured to:
obtain second new sensor data;
based on the second new sensor data, determine a second approximation of the location of the client device at the second time;
determine a second set of map cells centered on the second approximation of the location of the client device at the second time;
determine that at least one map cell in the second set of map cells is unavailable; and
based on determining that at least one map cell in the second set of map cells is unavailable, discontinue using the road network graph to determine locations of the client device.

18. The client device of claim 17, further comprising program instructions stored on the non-transitory computer-readable medium that are executable by the at least one processor such that the client device is configured to:
based on determining that at least one map cell in the second set of map cells is unavailable, transmit third new sensor data to the back-end platform to determine an updated location of the client device.

19. A non-transitory computer-readable medium, wherein the non-transitory computer-readable medium is provisioned with program instructions that, when executed by at least one processor, cause a client device to:
obtain initial sensor data that is indicative of a location of the client device at a first time;

based on the initial sensor data and a road network graph maintained on the client device, determine a set of particles corresponding to candidate road segments within the road network graph, wherein each particle comprises (i) a respective candidate trajectory of the client device along a respective candidate road segment within the road network graph, (ii) a respective candidate position and velocity of the client device along the respective candidate trajectory, and (iii) a respective probability that the particle accurately reflects the location of the client device within the road network graph at the first time;

identify a particle from the set of particles with a highest probability;

based on the identified particle from the set of particles with the highest probability, determine the location of the client device within the road network graph at the first time;

obtain new sensor data that is indicative of a location of the client device at a second time;

after obtaining the new sensor data, create a first updated set of particles by updating each particle in at least a subset of the set of particles to include:

(i) a respective updated candidate trajectory that comprises an extension of the respective candidate trajectory that was previously included in the particle;

(ii) a respective updated candidate position and velocity of the client device along the respective updated candidate trajectory; and (iii) a respective updated probability that the particle accurately reflects the location of client device within the road network graph at the second time;

identify a particle from the first updated set of particles with a highest probability; and based on the identified particle from the first updated set of updated particles with highest probability, determine the location of the client device within the road network graph at the second time.

20. The non-transitory computer-readable medium of claim 19, wherein the non-transitory computer-readable medium is also provisioned with program instructions that, when executed by at least one processor, cause the client device to:

determine that one or more particles in the first updated set of particles has a respective updated probability that is below a minimum threshold; and based on determining that the one or more particles in the first updated set of particles has the respective updated probability that is below a minimum threshold, remove the one or more particles from the first updated set of particles.

* * * * *